United States Patent
Wu et al.

(10) Patent No.: US 8,032,159 B2
(45) Date of Patent: Oct. 4, 2011

(54) METHOD FOR PAGING AND STOPPING PAGING TO AN IDLE MS AND A PAGING APPARATUS

(75) Inventors: Jianjun Wu, Shenzhen (CN); Yong Xie, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 458 days.

(21) Appl. No.: 12/233,143

(22) Filed: Sep. 18, 2008

(65) Prior Publication Data

US 2009/0017845 A1 Jan. 15, 2009

Related U.S. Application Data

(63) Continuation of application No. PCT/CN2007/000926, filed on Mar. 22, 2007.

(30) Foreign Application Priority Data

Mar. 22, 2006 (CN) .......................... 2006 1 0058406
Mar. 22, 2006 (CN) .......................... 2006 1 0058408

(51) Int. Cl.
*H04Q 7/20* (2006.01)

(52) U.S. Cl. ........ 455/458; 455/343; 455/434; 455/574; 455/422.1; 455/127.5

(58) Field of Classification Search .................. 455/458, 455/422.1, 343, 574, 127.5, 434
See application file for complete search history.

(56) References Cited

U.S. PATENT DOCUMENTS

| | | | | |
|---|---|---|---|---|
| 7,212,831 | B2 * | 5/2007 | Lee | 455/458 |
| 7,505,776 | B2 * | 3/2009 | Ryu et al. | 455/458 |
| 2006/0009242 | A1 * | 1/2006 | Ryu et al. | 455/458 |

(Continued)

FOREIGN PATENT DOCUMENTS

CN 1255275 5/2000

(Continued)

OTHER PUBLICATIONS

"IEEE Standard for Local and Metropolitan Area Networks; Part 16: Air Interface for Fixed and Mobile Broadband Wireless Access Systems; Amendment 2: Physical and Medium Access Control Layers for Combined Fixed and Mobile Operation in Licensed Bands *and* Corrigendum 1," Amendment 2 and Corrigendum 1 to IEEE Std. 802.16-2004, Mar. 6, 2006, 864 pages, IEEE.
English Translation of the Written Opinion of the International Searching Authority, PCT/CN2007/000926, Date of mailing: Jun. 28, 2007, 5 pages.
Chinese Office Action, Application No. 200610058408.X, Dated Feb. 12, 2010, 9 pages.

(Continued)

*Primary Examiner* — Charles Appiah
*Assistant Examiner* — Michael Vu
(74) *Attorney, Agent, or Firm* — Slater & Matsil, L.L.P.

(57) ABSTRACT

A method for paging an idle MS includes: a PC sends a Paging Announce message to the BS, starts a timer and sets a paging count threshold; the BS pages the MS; if no paging response is received from the MS before expiry of the timer, the PC compares the number of times of paging with the set paging count threshold, and re-sends the Paging Announce message or cancels the paging operation, according to the comparison result. A method for stopping paging to an idle MS includes: a BS in a PG pages an MS, and a network side sends a paging stop message to at least one other BS; and at least one other BS stops the paging process. A paging includes a central processing unit for setting a paging count threshold and judging whether a paging response is received.

10 Claims, 5 Drawing Sheets

U.S. PATENT DOCUMENTS

2006/0014550 A1 1/2006 Ryu et al.
2006/0040681 A1* 2/2006 Julka et al. .................... 455/458

FOREIGN PATENT DOCUMENTS

CN 1852196 10/2006
WO WO 2006/001674 A1 1/2006

OTHER PUBLICATIONS

Chinese Office Action, Application No. 200610058406.0, Dated Apr. 29, 2010, 6 pages.

Du Chong You. "Analysis of WiMAX Network". Mobile Communications, Jul. 2005, pp. 38-41.

* cited by examiner

US 8,032,159 B2

METHOD FOR PAGING AND STOPPING PAGING TO AN IDLE MS AND A PAGING APPARATUS

CROSS REFERENCE TO RELATED APPLICATIONS

The present application is a continuation of International Application No. PCT/CN2007/000926, filed on Mar. 22, 2007, which claims the benefit of Chinese Patent Application No. 200610058406.0, filed on Mar. 22, 2006, and Chinese Patent Application No. 200610058408.X, filed on Mar. 22, 2006, all of which are incorporated by reference herein in their entireties.

FIELD OF THE INVENTION

The present invention relates to a radio access technology, and in particular, to a technology of paging a Mobile Station (MS).

BACKGROUND

The idle mode is a working mode of an MS in a mobile broadband Radio Access System (RAS) defined by the IEEE 802.16e standard. In the idle mode, an MS moves in a large area, and receives the downlink broadcast service information at a specific interval. Broadcast messages are used to notify the MS whether any downlink service needs to be transmitted. While roaming in an area, an MS does not need to get registered on the Base Station (BS) of the roaming cell. Meanwhile, while roaming in different cells, the MS does not need to perform usual operation processes such as handover, which is conducive to saving MS power and air interface resources.

Multiple BSs make up a group, a Paging Group (PG). A PG is intended to constitute a continuous area, inside which the MS does not need to send uplink services but can use downlink paging channels to judge whether any downlink service is sent to the MS.

In the normal operation process on a serving BS, the MS may request to enter the idle mode by sending a message. Likewise, a serving BS can require an MS to enter the idle mode by sending a message. No matter whether the MS requests to enter the idle mode through a message or the serving BS requires the MS to enter the idle mode through a message, the MS needs to finish deregistration and enter the idle mode within the specified time segment.

The Worldwide Interoperability for Microwave Access (WiMAX) standard under development now defines a paging reference model in the idle mode. In the WiMax NWG standard draft, the function entities closely related to the idle mode and paging include:

a Paging Controller (PC), as a network entity for controlling activity of an MS in the idle mode, is designed to manage the activity and paging of the MS in the idle mode in a network. A PC may be located in an Access Service Network Gateway (ASN GW) which is a physical Network Element (NE) in a WiMAX network, or located in another stand-alone physical NE. For each MS in the idle mode, only one PC works to manage its activities, and is called anchor PC; and one or more PCs work to relay the messages from the MS to the anchor PC, and are called relay PC;

a Paging Agent (PA) is located in an ASN, and is designed to handle interaction for executing paging-related functions in the PC and the BS; and a Location Register (LR) is a distributed database, which stores information about the MS in the idle mode. A PC needs to send paging messages according to the PG currently containing the MS. Therefore, an LR is required for saving the state information, paging information and service stream information of the MS. Generally, each LR corresponds to one PC, and two logic entities work in the same logic entity.

As required, a Network Access Point (NAP) divides a network into several Paging Groups (PGs). One PG consists of one or more PAs (BSs), and is managed by the network operator. One PG must reside in a NAP. A BS and the related PAs may be entities in multiple PGs.

Regardless of other physical NEs and logic entities in the WiMAX network, the following description is made with respect to the WiMAX paging reference architecture shown in FIG. 1 (the technical solution under the present invention includes but is not limited to the application in a WiMAX system).

According to the paging reference model shown in FIG. 1, when an MS requests to enter the idle mode on BS1 (a serving BS), or BS1 instructs the MS to enter the idle mode, message interaction is performed between the MS and the BS1, between the BS1 and the back-end NE "ASN GW" to notify the PC that the MS enters the idle mode (this is implemented in the ASN GW1). The state information, paging information and service stream information of the MS are saved in the corresponding LR. After the MS enters the idle mode, the corresponding R4 and R6 interfaces need to be released, but the R3 interface between the Home Agent (HA) and the Foreign Agent (FA) must be reserved.

In the prior art, after a service occurs on the MS, the process of paging an MS at the network side is: The FA receives a downlink packet sent by the HA to the MSS, detects that the Mobile Subscriber Station (MSS) is in the idle mode, and hence sends an MSS Info Req message to the anchor PC, instructing the PC to page the MSS. After obtaining the information about the MSS, the anchor PC/LR replies with an MSS Info Rsp message. The anchor PC sends a Paging Announce message to the PA under its direct management; and sends a Paging Announce message to the relay PC that manages the PA if the PA is not directly managed by the anchor PC but is located in the corresponding PG After receiving the Paging Announce message, the PC forwards the message to the corresponding PA. After receiving the Paging Announce message, the PA initiates paging to the MS from an air interface.

In the prior art, however, an attempt of paging results in drastic waste of air interface resources, and increases complexity for allocation of the air interface resources. Moreover, the prior art does not describe how to instruct other BS to stop paging after the MS is paged successfully.

SUMMARY

Embodiments of the present invention provide a method for paging an idle MS, a method for stopping paging to an idle MS, with a view to avoiding waste of air interface resources and complexity for allocation of the air interface resources.

A method for paging an idle MS provided in an embodiment includes:

sending a Paging Announce message to the BS in the PG that contains the MS, and starting a timer;

making, by the BS, a response to the Paging Announce message, and paging the MS; and stopping paging to the MS when no paging response is received from the MS upon expiry of the timer.

Further, an apparatus for paging an idle MS provided in an embodiment includes at least a Paging Controller (PC), and a PG consisting of at least one BS, in which:

the PC further includes a paging unit, a paging judgment unit and a paging stop notification unit;

the paging unit is adapted to send a Paging Announce message to the BS in the PG that contains the MS;

the BS in the PG is adapted to respond to the Paging Announce message, and page the MS;

the paging judgment unit is adapted to judge whether a paging response is received from the MS within the predetermined time segment; and the paging stop notification unit is adapted to instruct the paging unit and/or other PC to stop paging after the paging judgment unit determines that no paging response is received from the MS within the predetermined time segment.

Further still, a method for stopping paging to an idle MS provided in an embodiment includes:

sending, by a network side, a paging stop message to at least one other BS in the PG when any BS in the PG pages the MS successfully; and responding, by at least one other BS, to the paging stop message and stopping the paging process.

Therefore, according to the methods for paging and stopping paging to an MS and the paging apparatus under the present invention, occupation of the air interface resources is decreased drastically, and complexity for allocation of the air interface resources is reduced.

DETAILED DESCRIPTION

Figure 1:
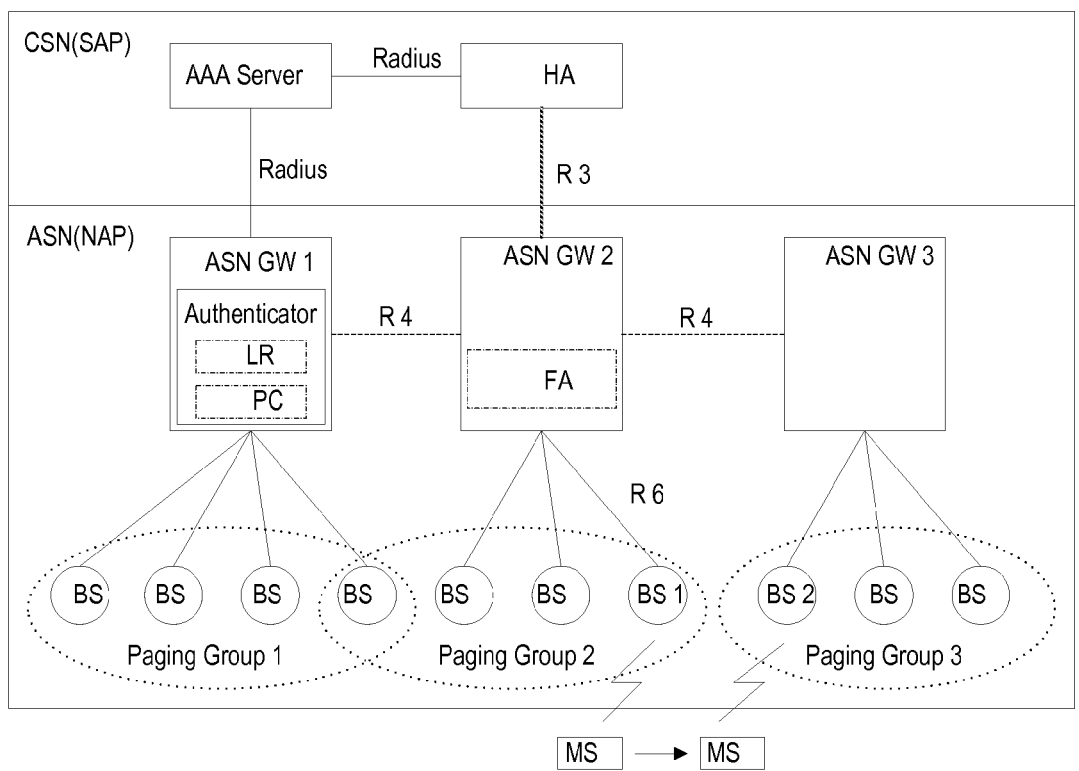
FIG. 1 shows a paging architecture of a WiMAX system in the prior art.

The prior art does not specify how to instruct other BS to stop paging after the MS is paged successfully. In a paging process, the paging message may be sent to multiple BSs in one attempt of paging. Such BSs page the MS through an air interface. If the MS stays in a BS, other BSs still send paging messages after the BS pages the MS successfully due to lack of a mechanism of instructing other BSs in the PG containing the MS no longer to send the paging message. In the prior art, other BSs send paging messages repeatedly, which results in drastic waste of air interface resources and increases complexity for allocation of the air interface resources. In order to address the foregoing technical issue, the present invention provides a method for paging an idle MS. The present invention is hereinafter described in detail with reference to the embodiments and accompanying drawings.

The first circumstance is: The paging is managed directly by an anchor PC.

The existing standard draft describes as follows:

When a network needs to page an idle MS, the ASN-GW containing the FA queries the ASN-GW containing the anchor PC/LR about the MS information. The anchor PC/LR knows the PG currently containing the MS according to the location records, and queries which ASN GW containing the relay PCs belongs to the PG Afterward, the anchor PC sends a message of paging the MS to the ASN GW that contains such relay PCs related to the PG This solution requires the anchor PC to configure and manage all possible PG information. Every PC may be an anchor PC of a different MS, so all PCs need to perform such configuration and management. Therefore, the data configuration quantity is huge and the management is complex.

In this case, the paging is managed directly by the anchor PC. The anchor PC finds the corresponding Paging Group ID (PGID), finds all topology views corresponding to the PGID and sends a paging message to the BS correlated to the PG Since the anchor PC may be unable to send the paging message to relevant BS directly, and the paging message may be forwarded through a correlated relay PC to the correlated BS.

Described in detail below is a method for paging an idle MS in the case that the anchor PC manages the paging directly. The general technical solution of the present invention is detailed as follows:

A. In the paging process, a timer is started for the PC and/or correlated BSs, and a paging count threshold is set for them, so as to exercise one-level or multi-level management on the paging and restrict the number of times of paging:

if the paging is under multi-level management, the timer is started for the anchor PC and all correlated BSs respectively, and a paging count threshold is set for them;

if the paging is under one-level management, the timer is started only for the anchor PC, and the paging count threshold is set for it. The correlated BSs receive the paging message from the anchor PC passively, and perform paging as instructed by the message. If the paging succeeds, the BS notifies the anchor PC; if the MS is not paged successfully, the BS takes no action, and the anchor PC re-sends the paging message or determine failure of paging according to the settings of the timer and the paging count threshold;

the paging count threshold can be preset and modified as required; through setting of a timer and a paging count threshold, the paging to the MS is controlled within a specified count and time, thus reducing occupation of the air interface resources effectively.

B. After a BS pages the MS successfully, the BS notifies the anchor PC, and the anchor PC sends a message to the correlated relay PC and BS to stop paging. This practice solves the following defect in the prior art: after the MS is paged successfully, other BSs in the PG that contains the MS continue paging, which results in drastic waste of air interface resources and increases complexity for allocation of the air interface resources. Moreover, this practice specifies how to instruct other BS to stop paging after the MS is paged successfully, which is not specified in the prior art.

Figure 2:
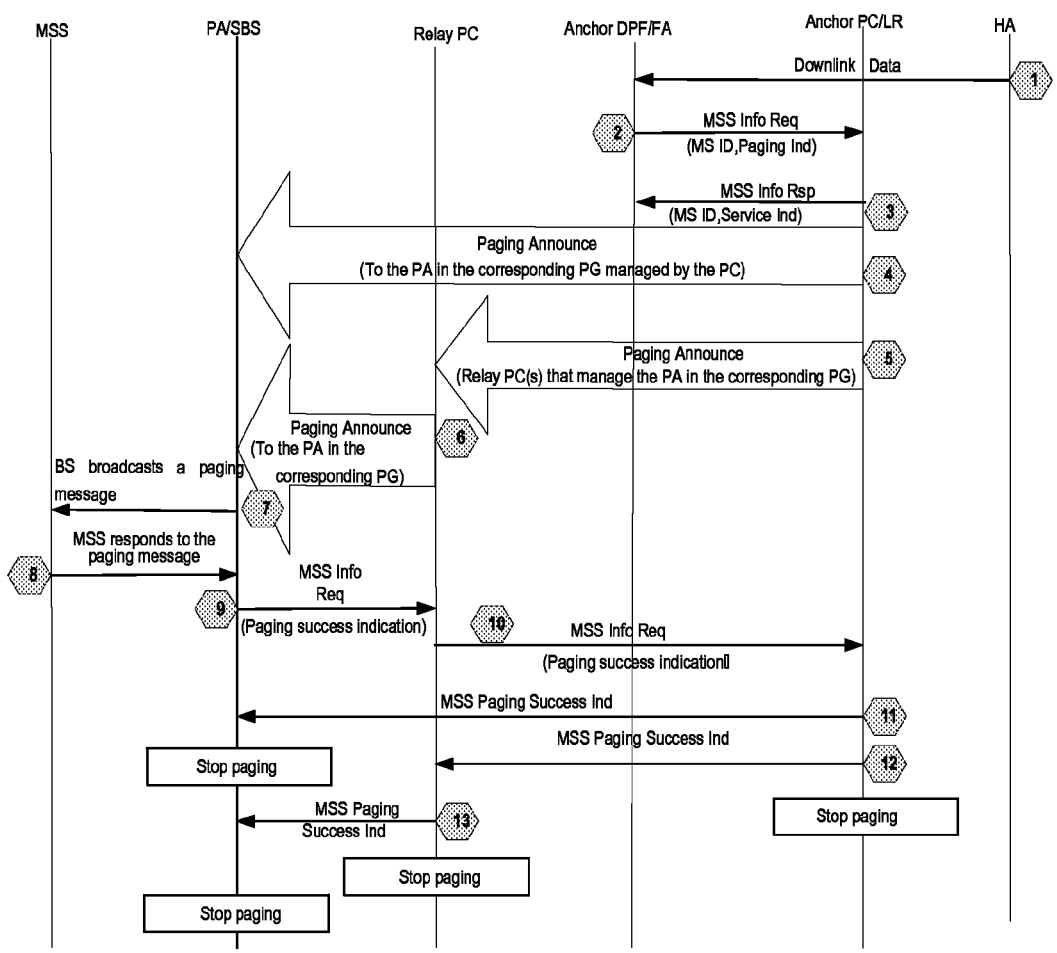
FIG. 2 is a flowchart of paging an idle MS in an embodiment of the present invention.

As shown in FIG. 2, the process of paging an idle MS in an embodiment of the present invention is as follows:

When a Foreign Agent (FA) receives a data packet from a Home Agent (HA), the FA discovers that the MS is idle. The FA finds the anchor PC information corresponding to the MS, and sends an MSS Info Req carrying the MSID and the paging indication to the anchor PC to instruct the anchor PC to initiate a paging process (as shown in steps 1, 2 and 3 in FIG. 2).

The anchor PC finds the PG information corresponding to the MS, finds all relay Paging Controller IDs (PCIDs) and Base Station IDs (BSIDs) correlated to the PG, and sends a Paging Announce message (as shown in steps 4 and 5 in FIG. 2). The Paging Announce message carries the MSID, PGID, Paging Cycle, and Paging Offset. Meanwhile, the timer T1 is started. If T1 does not expire and the number of times of paging does not exceed the paging count threshold, and if no paging response is received from the MS (namely, no information about successful paging to the MS is received), the anchor PC re-sends the paging message at a specific interval. If T1 expires or the number of times of paging reaches the threshold, the network regards the MS as unreachable and stops paging to it, and instructs the relay PC or BS engaged in the paging to stop paging.

After all relevant relay PCs receive the paging message from the anchor PC, the relay PCs know which BSs are recipients of the paging message according to the PGID and BSID in the Paging Announce message, and sends a Paging Announce message to the relevant BSs (as shown in "6" in FIG. 2). Meanwhile, the timer T2 is started. If T2 does not expire and the number of times of paging does not exceed the paging count threshold, and if no paging response is received from the MS (namely, no information about successful paging to the MS is received), the anchor PC re-sends the paging message at a specific interval. Besides, if the BS that receives a paging message from the anchor PC or relay PC is paging the MS (as shown in "7" in FIG. 2), a timer can be started and a paging count threshold can be set. If 1-level management mode applies, it is not necessary to start a timer or set a threshold here.

Through starting of a timer and setting of a threshold, the PC and the BS stop paging automatically once the threshold is crossed, thus releasing the air interface resources.

After the MS is paged successfully, the anchor PC sends a message to the relevant PCs still engaged in the paging to stop the paging process.

After a BS among all the BSs pages the MS successfully, the BS sends a paging response to the anchor PC, and the anchor PC stops paging to the MS and stops the relevant timer. Moreover, the network side sends a paging stop message to the remaining BSs and/or relay PCs. After receiving the paging stop message, the remaining BSs and relay PCs stop the timer and paging (see steps 9-13 in FIG. 2). The network side may be an anchor PC and/or a relay PC.

Once a BS pages the MS successfully, the MS accesses the network again under the BS, and initiate an MS context request process to the anchor PC to set up a data path. The process is notified to the FA, and is further notified by the FA to the anchor PC. Alternatively, when initiating an MS context request process to the anchor PC, the MS may notify the PC of successful paging, and require the anchor PC to cancel paging (if the notification is sent after completion of setting up the data path, the delay may be rather long). Alternatively, when the BS interacts with the anchor PC directly or through a relay PC, the BS notifies the anchor PC that the MS is paged successfully. Namely, after the BS pages the MS successfully, the BS sends a paging response to the anchor PC directly or through a relay PC, and the anchor PC sends a paging stop message to the BS or relay PC directly or through a relay PC.

After knowing that the MS is paged successfully, the anchor PC sends a paging stop message to the corresponding relay PC and BS to stop paging.

Therefore, the air interface resources are saved and the allocation of air interface resources is simplified.

The second circumstance is: The paging is managed through a relay PC.

A PG includes multiple BSs, a PG is managed by a specific PC, and a PC manages a specific combination of PGs. In the idle mode, the anchor PC is responsible only for the paging control function of the MS and for addressing the area of the MS. The specific management on the PG is exercised by the current relay PC of the PG In this case, the anchor PC only needs to record the relay PC that currently contains the MS. To page the MS, the anchor PC finds the relay PC according to the recorded ID of the relay PC that performs the last location update of the MS, and instructs the relay PC to initiate paging. The relay PC that performs the last location update of the MS is the most aware of the information about the PGs managed by the relay PC. If a PG is managed by more than one relay PC, the relay PC that manages a PG has the ID of another relay PC which also manages the PG In this process, if the anchor PC needs to page the MS, the paging message is sent to the relay PC that performs the last location update of MS, and the relay PC checks whether the PG is managed by adjacent relay PCs according to the PG information of the MS. If so, the relay PC not only performs paging within the BS in the PG, but also instructs the adjacent relay PCs to page the BS in the PG.

The foregoing process reduces the quantity of PGs managed by an anchor PC, and each PC needs to manage only a few specific PGs. Considering that a PG may be managed by more than one PC, each PC needs to not only have the information about the BSs in the area covered by the PG managed by the PC, but also have the information about the adjacent PCs in the PG managed by the PC.

The general technical solution of the present invention is as follows:

A. In the paging process, a timer is started for the PC and/or correlated BSs, and a paging count threshold is set for them, so as to exercise one-level or multi-level management on the paging and restrict the number of times of paging:

in the case that the paging is under multi-level management: the anchor PC, the relay PC that performs the last location update of the MS and all correlated BSs start the timer and set the paging count threshold respectively. This technical solution may be two-level management: the anchor PC and the relay PC start the timer and set the paging count threshold respectively; or three-level management: the anchor, the relay PC and the BS start the timer and set the paging count threshold respectively;

in the case that the paging is under multi-level management: the anchor PC sends a paging message to the relay PC that performs the last location update of the MS at a single attempt, and the subsequent paging process is performed by the relay PC. The Paging Group (PG) corresponding to the MS is maintained by the relay PC, and the relay PC knows the information about the BS correlated to the PG, and the information about other relay PCs correlated to the PG;

in the case that the paging is under 1-level management: The anchor PC starts a timer and sets a paging count threshold; the correlated relay PC that performs the last location update of the MS and the correlated BSs receive the paging message from the anchor PC passively. The paging is performed at a single attempt. If the paging succeeds, the relay PC or the BS notifies the anchor PC; if the paging fails, the relay PC or the BS makes no response, and the anchor PC re-sends the paging message or determine failure of paging according to the settings of the timer and the paging count threshold;

the paging count threshold can be preset and modified as required.

B. After a BS pages the MS successfully, the BS notifies the anchor PC, and the anchor PC sends a message to the correlated relay PC and BS to stop paging.

Figure 3:
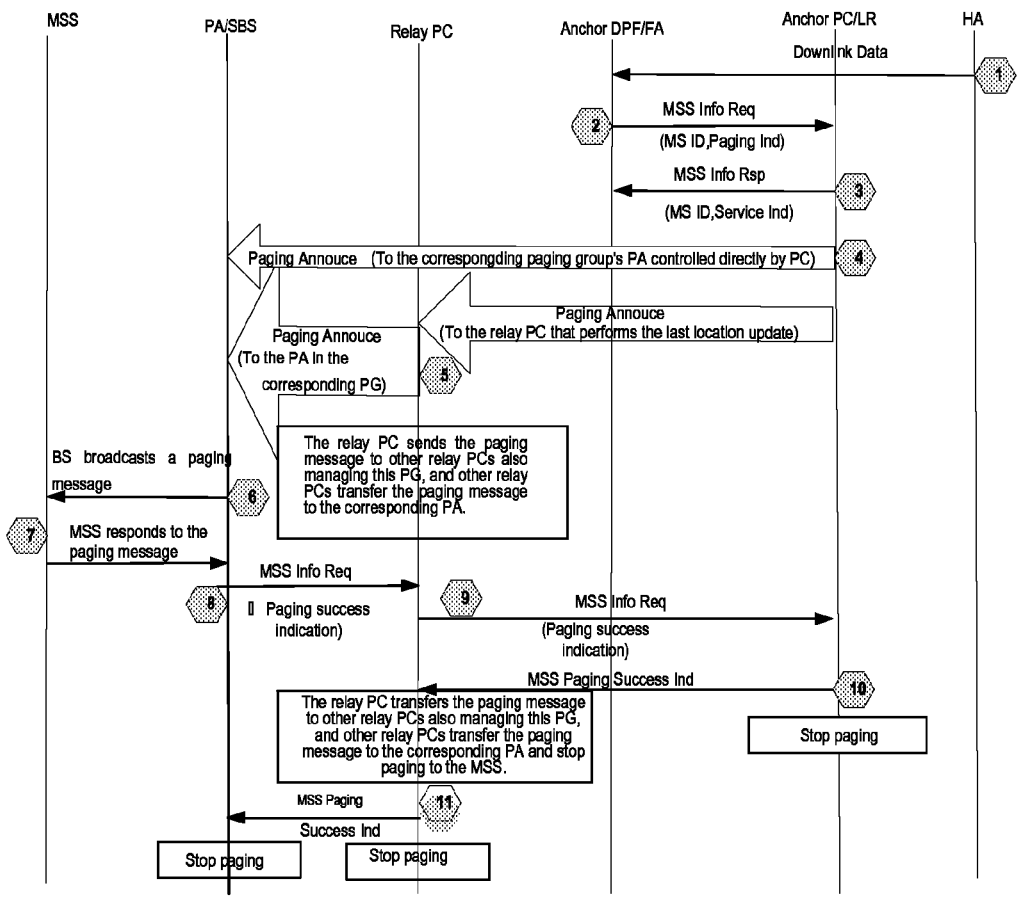
FIG. 3 is a flowchart of paging an idle MS in another embodiment of the present invention.

FIG. 3 is a flowchart of paging an idle MS in an embodiment of the present invention. The process of this embodiment is described below with reference to FIG. 4:

when a Foreign Agent (FA) receives a data packet from a Home Agent (HA), the FA discovers that the MS is idle; the FA finds the anchor PC information corresponding to the MS, and instructs the anchor PC to initiate a paging process (as shown in steps 1, 2 and 3 in FIG. 3).

The anchor PC finds the paging group information corresponding to the MS, finds the ID of the relay PC (PCID) that performs the last location update of the MS and the ID of the BS (BSID), and sends a Paging Announce message (step 4 in FIG. 3). The Paging Announce message carries the MSID, PGID, Paging Cycle, and Paging Offset. The anchor PC starts timer T1 and sets the paging count threshold (the anchor PC sends a paging message to the relay PC that performs the last location update of the MS at a single attempt). If the T1 does not expire and the number of times of paging does not exceed the paging count threshold, and if no paging response is received from the MS (namely, no information about successful paging to the MS is received), the anchor PC re-sends the paging message at a specific interval. If the relay anchor that performs the last location update of the MS is the anchor PC, the anchor PC sends a paging message directly to the BS corresponding to the paging group maintained by the anchor PC.

After receiving the paging message from the PC, the relay PC1 that performs the last location update of the MS knows the BS information corresponding to the PGID and the other adjacent relay PCs correlated to the PG according to the PGID in the Paging Announce message and the paging group information maintained by the relay PC1. After obtaining such information, the relay PC1 sends a Paging Announce message to the BS under the PG maintained by the relay PC1, and to the relay PCs correlated to the PG (step 5 in FIG. 3); and starts the timer T2 and sets a paging count threshold (which can be preset). If T2 does not expire and the number of times of paging does not exceed the paging count threshold, and if no paging response is received from the MS (namely, no information about successful paging to the MS is received), the relay PC re-sends the paging message at a specific interval.

After receiving the paging message from the relay PC1 that performs the last location update of the MS, the relevant BSs and adjacent relay PCs send a paging message (step 6 in FIG. 3) and start the timer T3 (which works in the same way as T1 and T2). Three-level paging management (involving three timers) is applied here. Alternatively, only two timers in addition to a PC may apply. Here the BS or relay PC do not need to start a timer, and the time can be controlled by the relay PC that performs the last location update of the MS, as mentioned in section (3). If the 1-level management mode applies, it is not necessary to start a timer or set a threshold here.

After a BS among all the BSs pages the MS successfully, the BS sends a paging response or a message carrying a paging success indication to the anchor PC, and the anchor PC stops paging to the MS and stops the relevant timer. Moreover, the network side sends a paging stop message to the remaining BSs and/or relay PCs. After receiving the paging stop message, the remaining BSs and relay PCs stop the timer and paging (see steps 7-11 in FIG. 3). The network side may be an anchor PC and/or a relay PC.

Once a BS pages the MS successfully at the air interface (the paging success is indicated if the MS sends a ranging request "RNG_REQ" request under the BS), the BS initiates a context request process to the anchor PC, thus indicating successful paging from the anchor PC to the MS. In this process, if the BS that receives the paging falls within the local management scope of the anchor PC, a paging stop message is sent by the anchor PC to the correlated BSs and other relay PCs, and then the relay PCs instruct the correlated BS to stop paging. If the BS that receives the paging falls within the management scope of the relay PC, a paging stop message is sent by the relay PC to the relevant BSs and the remaining relay PCs. Alternatively, the anchor PC instructs the relevant relay PCs to stop paging to the MS after receiving a paging response message.

This embodiment can also achieve the effects of the embodiment in which the paging is directly managed by an anchor PC: by setting a timer and a paging count threshold, the paging to the MS is controlled within a specified count and time, thus reducing occupation of the air interface resources effectively. This practice overcomes the following defect in the prior art: after the MS is paged successfully, other BSs in the PG that contains the MS continue paging, which results in drastic waste of air interface resources and increases complexity for allocation of the air interface resources. Moreover, this practice specifies how to instruct other BS to stop paging after the MS is paged successfully, which is not specified in the prior art. The quantity of PGs managed by the anchor PC is decreased.

The following embodiments of the present invention provide a method for stopping paging to an idle MS. Once a BS detects an RNG_REQ message sent by the MS under the BS, which indicates that the MS is paged successfully, the MS accesses the network again under the BS, and initiate an MS context request process to the anchor PC to set up a data path. The process is notified to the FA, and is further notified by the FA to the anchor PC. Alternatively, when initiating an MS context request process to the anchor PC, the MS may notify the PC of successful paging, and require the anchor PC to cancel paging (if the notification is sent after the data path set up, the delay may be rather long).

In this embodiment, after a BS among all the BSs pages the MS successfully, the BS sends a paging response or a message carrying a paging success indication to the relay PC, and the relay PC instructs the PA in the PG under the relay PC to stop paging, and instructs other corresponding relay PCs to stop paging from the BS in the relay PCs to the MS.

In this embodiment, after the BS pages the MS successfully, the BS sends a paging response carrying a paging success indication to the anchor PC directly or through a relay PC; and the anchor PC sends a paging success message to the BS or the relay PC directly or through a relay PC. Then the BS stops paging to the MS. Namely, in the process of interaction from the BS to the anchor PC directly or through a relay PC, the BS notifies the anchor PC that the MS is paged successfully.

The above embodiments of the present invention are intended to clarify how a paging process is completed, and how to instruct other BSs or relay PCs to stop paging after a BS pages the MS successfully. In one attempt of paging, the paging message may be sent to multiple BSs. Such BSs page the MS through an air interface. If the MS stays under a BS, once the BS pages the MS successfully, a mechanism is required to instructs other BSs in the PG containing the MS no longer to send the paging message. Otherwise, other BSs still send the paging message repeatedly, which results in drastic waste of air interface resources and increases complexity for allocation of the air interface resources.

Further, the present invention provides another method for stopping paging to an idle MS. The anchor PC sends a Paging Announce message to the BS, and the message carries the information indicating how the BS sends the paging message at the air interface. Such information may be information about number of times or duration of sending the paging message. If the information is about the count of sending the paging message, the anchor PC requires the BS to send the paging message for a specified number of times. Before receiving an explicit paging stop message from the MS, the BS sends the paging message for the specified number of times. For example, "2" means to send the paging message for 2 times; "5" means to send the paging message for 5 times; "0" means to send the paging message for infinite times (until receiving a paging stop message from the network). If the anchor PC specifies a duration, the BS keeps paging within the specified duration, and longer pages the MS upon expiry of the specified duration.

Figure 4:
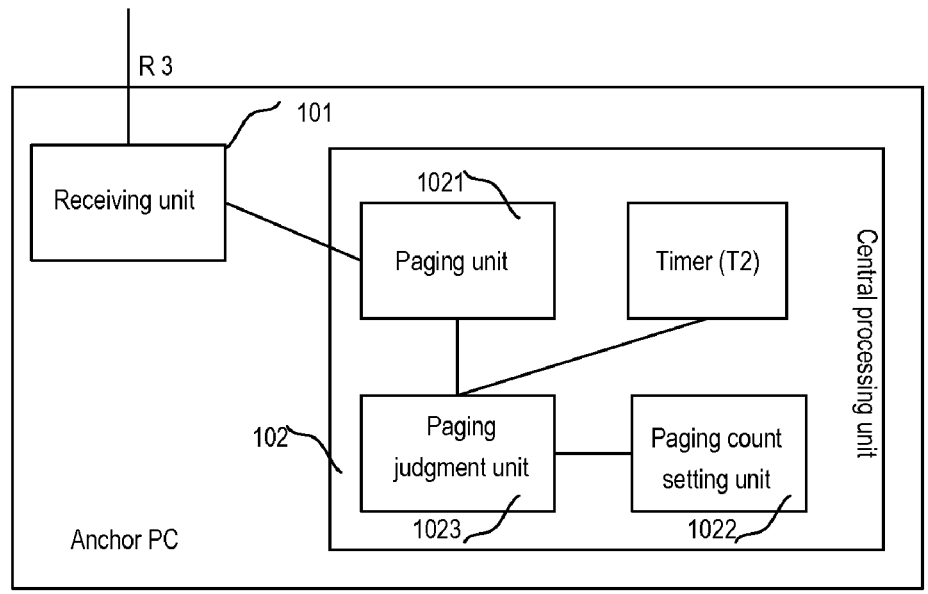
FIG. 4 shows the structure of an anchor PC according to the first embodiment of the present invention.

As shown in FIG. 4, a paging apparatus provided in an embodiment of the present invention includes: a receiving unit 101, adapted to receive paging request messages through a radio interface; and a central processing unit 102, adapted to send Paging Announce messages through a radio interface, start a timer, set a paging count threshold, and judge whether a paging response is received. In the anchor PC in this embodiment, a receiving unit 101 receives the MS information request carrying the MSID and the paging indication information sent from the HA; after the central processing unit 102 receives the request, the anchor PC initiates a paging process. The paging unit 1021 in the central processing unit finds the PG information corresponding to the MS, finds all relay PCIDs or the ID of the relay PC (PCID) that performs the last location update of the MS as well as the ID of the BS (BSID), and sends a Paging Announce message; the message carries the MSID, PGID, paging cycle, and paging offset; meanwhile, the timer T1 is started; the paging count setting unit 1022 presets a paging count threshold. If determining that the T1 does not expire, the paging count does not exceed the threshold and no notification about successful paging to the MS is received, the paging judging unit 1023 triggers the paging unit 1021 to re-send the Paging Announce message at a specific interval and the anchor PC re-sends the message.

Figure 5:
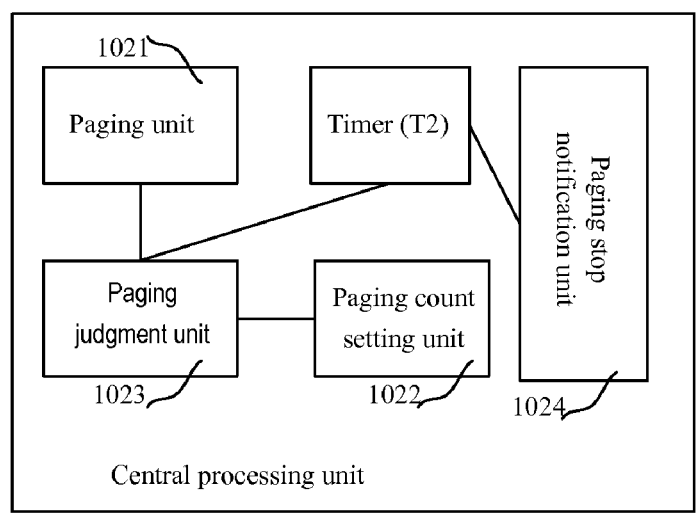
FIG. 5 shows the structure of an anchor PC according to the second embodiment of the present invention.

As shown in FIG. 5, the central processing unit of the anchor PC in the second embodiment further includes: a paging stop notification unit 1024, adapted to stop the timer after receiving a paging response. The PC sends a paging response to the BS or the relay PC directly or through a relay PC to stop paging.

Figure 6:
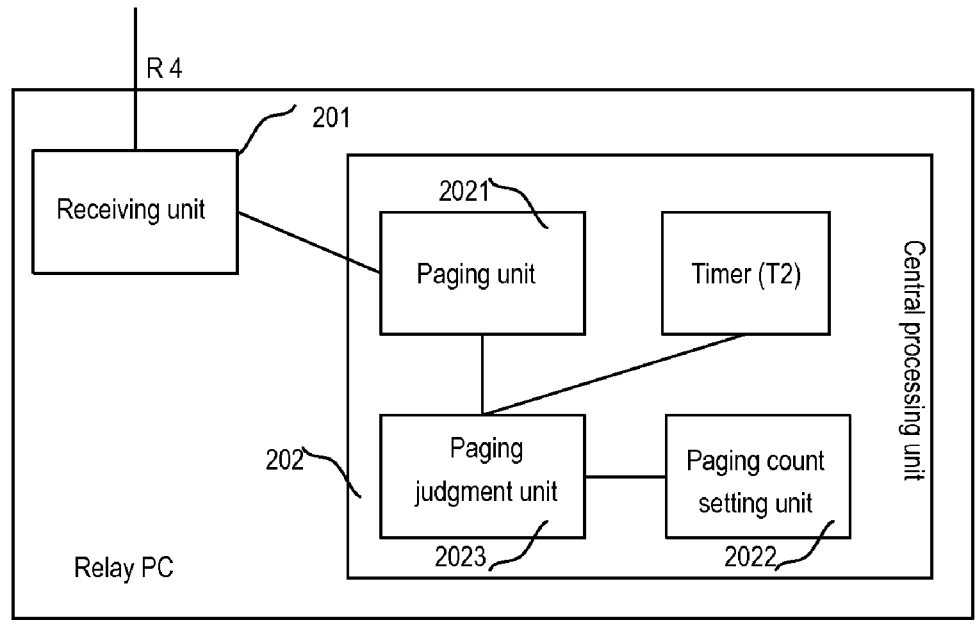
FIG. 6 shows the structure of a relay PC according to the third embodiment of the present invention.

In the relay PC in third embodiment shown in FIG. 6, a receiving unit 201 receives a paging message from the anchor PC, and, according to the PGID and BSID in the Paging Announce message, knows the BSs to which the paging message is sent. The paging unit 2021 in the central processing unit 202 sends a Paging Announce message to the relevant BSs, and starts timer T2. The paging count setting unit 2022 presets a paging count threshold. If determining that the paging count does not exceed the threshold and no paging response is received, the paging judging unit 2023 triggers the paging unit 2021 to re-send the Paging Announce message at a specific interval and the relay PC re-sends the message.

Figure 7:
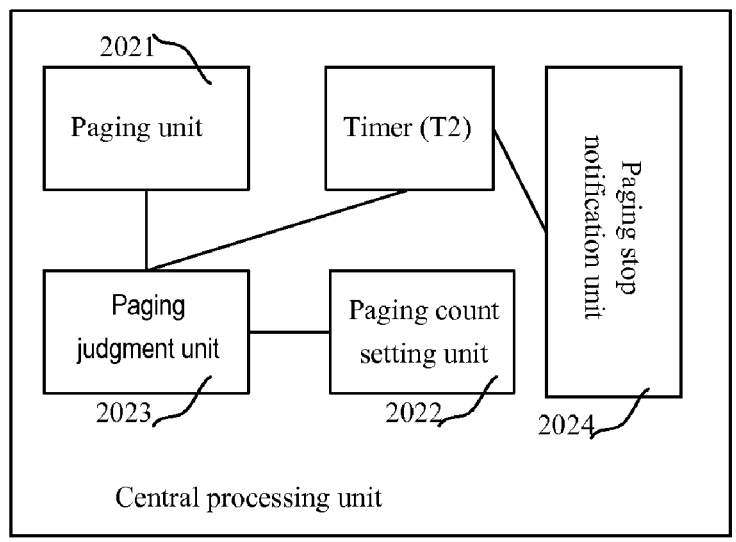
FIG. 7 shows the structure of a relay PC according to the fourth embodiment of the present invention.

As shown in FIG. 7, the central processing unit of the relay PC in the fourth embodiment further includes: a paging stop notification unit 2024, adapted to stop the timer after receiving a paging success response. The PC sends a paging stop message to the BS or the relay PC directly or through a relay PC to stop paging.

In the BS in this embodiment, a receiving unit 301 receives a paging message from the relay PC; according to the Paging Announce message, the paging unit 3021 of the central processing unit 302 sends the Paging Announce message to the relevant MSs, and starts timer T3. The paging count setting unit 3022 presets a paging count threshold. If determining that T2 does not expire, the number of times of paging does not exceed the threshold and no notification is received from the relevant MS, the paging judging unit 3023 triggers the paging unit 3021 to re-send the Paging Announce message at a specific interval. The architecture is shown in FIG. 4 and FIG. 6.

The central processing unit of the BS in this embodiment further includes: a paging stop notification unit 3024, adapted to stop the timer after receiving a paging success response. When the BS interacts with the anchor PC directly or through a relay PC, the BS notifies the anchor PC that the MS is paged successfully. Namely, after the BS pages the MS successfully, the BS sends a paging response to the anchor PC directly or through a relay PC. The architecture is shown in FIG. 6 and FIG. 8.

The method under the present invention is applicable to (but without limitation to) a WiMAX system and other radio access networks such as 802.20-based mobile Metropolitan Area Network (MAN) system.

In the practical application, those skilled in the art may make proper improvements according to the exemplary embodiments of the present invention in order to meet the specific requirements. It should be understood that although the invention has been described through some exemplary embodiments, the invention is not limited to such embodiments.

What is claimed is:

1. A method for paging an idle Mobile Station (MS), comprising:
    sending a Paging Announce message to a Base Station (BS) in a Paging Group (PG) containing the MS, and starting a timer;
    responding, by the BS, to the Paging Announce message, and paging the MS; and
    stopping paging to the MS when no paging response is received from the MS upon expiry of the timer;
    wherein a relay paging controller (PC) sends the Paging Announce message to the BS in the PG according to the Paging Announce message of an anchor PC and the PG information of the MS:
    wherein the relay PC is the relay PC that performs the last location update of the MS, or a relay PC adjacent to the relay PC performing the last location update of the MS;
    wherein the BS sends a paging response to the anchor PC and/or the correlated relay PC upon paging the MS successfully before expiry of any timer;
    wherein the BS sends a paging response or a message indicative of paging success to the anchor PC and/or the correlated relay PC, after the BS pages the MS successfully; and
    wherein the relay PC directly instructs a Paging Agent (PA) in the corresponding PG under the relay PC to stop paging, and instructs other correlated relay PCs to stop paging from the BS in the correlated relay PCs to the MS.

2. The method of claim 1, wherein a paging count threshold is set; and the Paging Announce message is re-sent if the number of paging does not exceed the paging count threshold before the timer expires.

3. The method of claim 1, wherein the relay PC starts its timer and/or sets its paging count threshold when sending a Paging Announce message; and stops sending the Paging Announce message as soon as the timer expires and/or the number of times of paging exceeds the paging count threshold if no paging response is received from the MS.

4. The method of claim 1, wherein the anchor PC and/or the correlated relay PC responds to the paging response and stops paging.

5. A method for paging an idle Mobile Station (MS), comprising:

sending, by an anchor Paging Controller (PC), a Paging Announce message to a relay PC, and starting a timer;

sending, by a relay Paging Controller (PC), the Paging Announce message to the BS in the PG according to the Paging Announce message of the anchor PC and PG information of the MS responding, by the BS, to the Paging Announce message, and paging the MS; and stopping paging to the MS when no paging response is received from the MS upon expiry of the timer, wherein the relay PC is the relay PC that performs the last location update of the MS, or a relay PC adjacent to the relay PC performing the last location update of the MS, wherein the BS sends a paging response or a message indicative of paging success to the anchor PC and/or the correlated relay PC, after the BS pages the MS successfully before expiry of the timer; and wherein the relay PC directly instructs a Paging Agent (PA) in the corresponding PG under the relay PC to stop paging, and instructs other correlated relay PCs to stop paging from the BS in the correlated relay PCs to the MS.

6. The method of claim 5, wherein:

the BS sends a paging response or a message indicative of paging success to the anchor PC directly or through a relay PC; and the anchor PC sends a paging stop notification to the BS or the relay PC directly or through a relay PC.

7. The method according to claim 5, wherein the Paging Announce message comprises the information indicating the BS stop paging at the air interface, and such information comprises time indication and/or count indication.

8. An apparatus for paging an idle Mobile Station (MS), comprising at least a Paging Controller (PC), and a Paging Group (PG) consisting of at least one Base Station (BS), the PC further comprising a paging unit, a paging judgment unit, and a paging stop notification unit; wherein the paging unit is configured to send a Paging Announce message to the BS in the PG that contains the MS;

the BS in the PG is configured to respond to the Paging Announce message, and page the MS;

the paging judgment unit is configured to judge whether a paging response is received from the MS within the predetermined time segment;

the paging stop notification unit is configured to instruct the paging unit and/or other PC to stop paging after the paging judgment unit determines that no paging response is received from the MS within the predetermined time segment;

the PC further comprises a paging count setting unit which is configured to set a paging count threshold; and the paging judgment unit compares the paging count of the paging unit with the paging count threshold within the predetermined time segment, and instructs the paging stop unit to stop paging once the number of times of paging hits the threshold.

9. The apparatus of claim 8, wherein the PC is an anchor PC.

10. The apparatus of claim 8, wherein the PC is a relay PC.

* * * * *